US011225417B2

United States Patent
Lee et al.

(10) Patent No.: US 11,225,417 B2
(45) Date of Patent: Jan. 18, 2022

(54) METHOD OF PREPARING HIGH-PURITY LITHIUM DIFLUOROPHOSPHATE CRYSTAL AND NON-AQUEOUS ELECTROLYTE SOLUTION FOR SECONDARY BATTERY INCLUDING THE CRYSTAL

(71) Applicant: CHUN BO., LTD, Chungcheongbuk-do (KR)

(72) Inventors: Sang Yul Lee, Chungcheongbuk-do (KR); Kyoung Cheol Kim, Chungcheongbuk-do (KR); Kyoung Hwan Kim, Chungcheongbuk-do (KR); Ji Ung Jeon, Chungcheongbuk-do (KR); Su Cheol Park, Chungcheongbuk-do (KR)

(73) Assignee: Chun Bo., Ltd, Chungcheongbuk-do (KR)

( * ) Notice: Subject to any disclaimer, the term of this patent is extended or adjusted under 35 U.S.C. 154(b) by 0 days.

(21) Appl. No.: 16/476,858

(22) PCT Filed: Jun. 25, 2018

(86) PCT No.: PCT/KR2018/007158
§ 371 (c)(1),
(2) Date: Jul. 9, 2019

(87) PCT Pub. No.: WO2019/245091
PCT Pub. Date: Dec. 26, 2019

(65) Prior Publication Data
US 2021/0246042 A1    Aug. 12, 2021

(30) Foreign Application Priority Data
Jun. 22, 2018 (KR) .......................... 10-2018-0072038

(51) Int. Cl.
*H01M 10/0525* (2010.01)
*H01M 10/0568* (2010.01)
*C01D 15/00* (2006.01)

(52) U.S. Cl.
CPC ........ *C01D 15/00* (2013.01); *H01M 10/0525* (2013.01); *H01M 10/0568* (2013.01)

(58) Field of Classification Search
CPC .............. C01D 15/00; H01M 10/0525; H01M 10/0568; H01M 10/0563; H01M 2300/002; C01B 25/455; B01J 31/12; C01P 2006/80; Y02E 60/10
See application file for complete search history.

(56) References Cited

U.S. PATENT DOCUMENTS

| 2010/0015514 A1* | 1/2010 | Miyagi | H01M 50/46 429/129 |
| 2015/0099193 A1* | 4/2015 | Hamasaki | H01M 4/505 429/338 |
| 2021/0119256 A1* | 4/2021 | Hidaka | H01M 10/0567 |
| 2021/0246027 A1 | 8/2021 | Lee et al. | |

FOREIGN PATENT DOCUMENTS

| CN | 105731412 | | 7/2016 |
| CN | 107244663 | * | 4/2017 |
| CN | 107244663 | | 10/2017 |
| EP | 2357154 | | 8/2011 |
| EP | 2712843 | | 9/2012 |
| EP | 2826747 | | 1/2015 |
| EP | 3231769 | | 10/2017 |
| JP | 2001-006729 | | 1/2001 |
| JP | 2002-501034 | | 1/2002 |
| JP | 2005-219994 | | 8/2005 |
| JP | 2014-062036 | | 4/2014 |
| JP | 2015-044701 | | 3/2015 |
| JP | 2015-523951 | | 8/2015 |
| KR | 10-2009-0118117 | | 11/2009 |
| KR | 10-2011-0052536 | | 5/2011 |
| KR | 10-2013-0102969 | | 9/2013 |
| KR | 10-2015-0016511 | | 2/2015 |
| KR | 10-2015-0045528 | | 4/2015 |
| KR | 10-2017-0042079 | | 4/2017 |
| KR | 10-2017-39936 | | 6/2017 |
| KR | 10-2017-0078784 | | 7/2017 |
| WO | WO 2019018999 | * | 1/2019 |

OTHER PUBLICATIONS

CN107244663 MT (Year: 2017).*
KR192046 Abstract (Year: 2018).*
Notice of Allowance for KR 10-2018-0072038, dated Nov. 13, 2018, 7 pages (Including English translation).
European Search Report dated Sep. 22, 2020 directed to European Patent Application No. 18889958.7; 7 pgs.
Amendment for KR 10-2018-0072038 dated Sep. 21, 2018, and English translation.
Office Action for KR 10-2018-0072038 dated Sep. 13, 2018 and English translation.
Response for KR 10-2018-0072038 dated Sep. 21, 2018, and English translation.

* cited by examiner

*Primary Examiner* — Alexander Usyatinsky
(74) *Attorney, Agent, or Firm* — Morrison & Foerster LLP

(57) ABSTRACT

The present invention relates to a method of preparing a lithium difluorophosphate crystal. More particularly, the present invention relates to a method of preparing a high-purity lithium difluorophosphate crystal at a high yield, and the high-purity lithium difluorophosphate crystal prepared by the method can be used for various purposes.

7 Claims, No Drawings

METHOD OF PREPARING HIGH-PURITY LITHIUM DIFLUOROPHOSPHATE CRYSTAL AND NON-AQUEOUS ELECTROLYTE SOLUTION FOR SECONDARY BATTERY INCLUDING THE CRYSTAL

CROSS REFERENCE TO RELATED APPLICATIONS

This application is a national stage application under 35 U.S.C. § 371 of International Application No. PCT/KR2018/007158, filed internationally on Jun. 25, 2018, which claims priority to and the benefit of Korean Patent Application No. 2018-0072038, filed on 22 Jun. 2018, the disclosures of which are incorporated herein by reference in their entirety.

BACKGROUND

1. Field of the Invention

The present invention relates to: a method of preparing a lithium difluorophosphate crystal; and a non-aqueous electrolyte solution for a secondary battery, which includes the lithium difluorophosphate crystal.

2. Discussion of Related Art

Lithium difluorophosphate is a compound having industrial utility as a component for a wood preservative (see Patent Document 1), a toothbrush sterilizer, a polymer stabilizer, and the like.

Meanwhile, in response to recent demands for the weight reduction and miniaturization of electric products, the development of a secondary battery having a high energy density, e.g., a lithium ion secondary battery, is underway. Further, the application field of lithium ion secondary batteries is expanding, and this expansion requires the batteries to have even more improved characteristics. In order to bring an improvement to the battery characteristics, such as load characteristics, cycle characteristics, storage characteristics, low-temperature characteristics, and the like, of such lithium ion secondary batteries, non-aqueous solvents and electrolytes have been considered and extensively studied. For example, a battery in which the decomposition of an electrolyte solution is suppressed to the minimum and thus excellent storage characteristics and excellent cycle characteristics are exhibited is currently in production using an electrolyte solution containing a vinyl ethylene carbonate compound, and there has been disclosed a technique of increasing the recovery capacity after storage of an existing lithium ion secondary battery by using an electrolyte solution containing propanesultone along with the battery.

The existing electrolyte solutions for a lithium ion secondary battery may exhibit the effect of improving the storage characteristics or the cycle characteristics to some extent, but have limitations in that a coating having high resistance is formed on the negative electrode side, adversely affecting the low-temperature discharge characteristics, the high-current discharge characteristics, or the like.

Hence, there has been developed a technique of employing lithium difluorophosphate having excellent safety while being capable of improving the low-temperature discharge characteristics, the high-current discharge characteristics, the high-temperature storage characteristics, and the cycle characteristics as a component (additive) for a secondary battery electrolyte solution. The technique, however, has its limitations in that lithium difluorophosphate is prepared with low efficiency, low purity, and the like.

PRIOR-ART DOCUMENTS

Patent Documents

Patent Document 1: Japanese Unexamined Patent Publication No. 2002-501034 (Published on Jan. 15, 2002)
Patent Document 2: Japanese Unexamined Patent Publication No. 2001-006729 (Published on Jan. 12, 2001)

SUMMARY OF THE INVENTION

The present invention was devised to solve the above-described problems, and is directed to providing a novel method of preparing a high-purity lithium difluorophosphate crystal and the use of the prepared lithium difluorophosphate crystal as an electrolyte for a secondary battery and the like.

To solve the above-described problems, one aspect of the present invention provides a method of preparing a lithium difluorophosphate crystal in which a lithium difluorophosphate crystal is prepared through the processes including: Step 1 in which a lithium difluorophosphate crystal ($LiPO_2F_2$) is synthesized using a reactant including a compound represented by the following Chemical Formula 1; and Step 2 in which the lithium difluorophosphate crystal is purified and subsequently recrystallized.

[Chemical Formula 1]

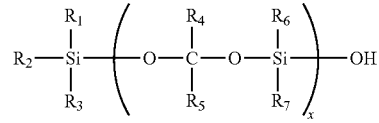

In Chemical Formula 1, $R_1$ to $R_3$ each independently include a $C_{1-10}$ linear alkyl group, a $C_{3-10}$ branched alkyl group, a $C_{6-10}$ cycloalkyl group, a $C_{1-10}$ alkoxy group, a $C_{1-5}$ linear alkyl group having a halide group, a $C_{3-10}$ branched alkyl group having a halide group, an aryl group, or an aryl group having a halide group, $R_4$ to $R_7$ each independently include a hydrogen atom, a $C_{1-10}$ linear alkyl group, a $C_{3-10}$ branched alkyl group, a $C_{1-10}$ alkoxy group, or an aryl group, and X is an integer of 0 to 10.

In one preferred embodiment of the present invention, the Step 1 may consist of the processes including: Step 1-1 in which a liquid mixture of lithium hexafluorophosphate, the above-described reactant, and a solvent is subjected to a synthesis reaction for 10 to 20 hours under an inert gas at a temperature of 45 to 80° C., and thereby a solution containing a reaction product is obtained; and Step 1-2 in which the solution of the Step 1-1 is cooled and subsequently filtered, and thereby the reaction product contained in the solution is obtained.

In one preferred embodiment of the present invention, in the Step 1-1, the synthesis reaction may be carried out for 10 to 20 hours at a temperature of 45 to 80° C.

In one preferred embodiment of the present invention, in the Step 1-1, the lithium hexafluorophosphate may be used in an amount such that the liquid mixture contains the lithium hexafluorophosphate at a concentration of 1.5 to 5 mol/L.

In one preferred embodiment of the present invention, in the liquid mixture of the Step 1-1, the lithium hexafluorophosphate and the reactant may be included in a molar ratio of 1:1.0 to 3.0.

In one preferred embodiment of the present invention, the solvent of the Step 1-1 may include one or more selected among a di($C_{1-10}$ alkyl) carbonate, propylene carbonate, and butylene carbonate.

In one preferred embodiment of the present invention, the yield of the lithium difluorophosphate crystal synthesized in the Step 1 may range from 85 to 95%.

In one preferred embodiment of the present invention, the Step 2 of the method of preparing a high-purity lithium difluorophosphate crystal according to the present invention may consist of the processes including: Step 2-1 in which a lithium difluorophosphate crystal and an aqueous solution of a $C_{2-4}$ alcohol are introduced into a reactor and subjected to stirring, and thereby purification is performed; Step 2-2 in which the purified product is subjected to primary vacuum concentration; Step 2-3 in which the primary vacuum concentrate is subjected to secondary vacuum concentration; and Step 2-4 in which the secondary vacuum concentrate is dried and subsequently cooled to induce recrystallization, and thereby a lithium difluorophosphate crystal is obtained.

In one preferred embodiment of the present invention, the reactor of the Step 2-1 may be equipped with a jacket, a vacuum pump, a condenser, and a receiver.

In one preferred embodiment of the present invention, in the Step 2-1, the aqueous alcohol solution may be used in an amount of 550 to 650 parts by weight with respect to 100 parts by weight of the lithium difluorophosphate crystal.

In one preferred embodiment of the present invention, the purification process of the Step 2-1 may be performed in a nitrogen atmosphere at a temperature of 23 to 30° C., the primary vacuum concentration of the Step 2-2 may be performed at a temperature of 40 to 45° C. and a pressure of 25 to 30 Torr, and the secondary vacuum concentration of the Step 2-3 may be performed at a temperature of 40 to 45° C. and a pressure of 2 Torr or less.

In one preferred embodiment of the present invention, the drying process of the Step 2-4 may be performed using a rotary evaporator in a vacuum atmosphere of 2 Torr or less at a temperature of 70 to 90° C.

In one preferred embodiment of the present invention, in the Step 2-4, the yield of the lithium difluorophosphate crystal obtained through recrystallization may range from 80 to 92%.

In one preferred embodiment of the present invention, the method of preparing a high-purity lithium difluorophosphate crystal according to the present invention may further include, after Steps 1 and 2, Step 3 in which the lithium difluorophosphate crystal obtained through recrystallization is dried.

In one preferred embodiment of the present invention, the lithium difluorophosphate crystal obtained through the recrystallization of the Step 2-4 may have a degree of relative increase in yield of 3.0 to 15% as calculated by the following Equation 1.

Degree of relative increase in yield (%)={(A−B)/B}×100%   [Equation 1]

In Equation 1, A represents the yield (%) of a $LiPO_2F_2$ crystal obtained using a reactant including a compound represented by Chemical Formula 1 and recrystallized, and B represents the yield (%) of a $LiPO_2F_2$ crystal obtained using $Si(CH_3)_3OCH_3$ as a reactant and recrystallized.

In one preferred embodiment of the present invention, the lithium difluorophosphate crystal obtained through the recrystallization of the Step 2-4 may have a degree of relative increase in purity of 1 to 7% as calculated by the following Equation 2.

Degree of relative increase in purity (%)={(A−B)/B}×100%   [Equation 2]

In Equation 2, A represents the purity (%) of a $LiPO_2F_2$ crystal obtained using a reactant including a compound represented by Chemical Formula 1 and recrystallized, and B represents the purity (%) of a $LiPO_2F_2$ crystal obtained using $Si(CH_3)_3OCH_3$ as a reactant and recrystallized.

Another aspect of the present invention provides a high-purity lithium difluorophosphate crystal prepared by the above-described preparation method.

Still another aspect of the present invention provides the use of the high-purity lithium difluorophosphate crystal as an electrolyte for a non-aqueous electrolyte solution for a secondary battery.

Yet another aspect of the present invention provides a non-aqueous electrolyte solution for a secondary battery, which includes the lithium difluorophosphate crystal as an electrolyte.

DETAILED DESCRIPTION OF EXEMPLARY EMBODIMENTS

Hereinafter, the method of preparing a high-purity lithium difluorophosphate crystal according to the present invention will be described in more detail.

The lithium difluorophosphate crystal of the present invention may be prepared by the processes including: Step 1 in which a lithium difluorophosphate crystal ($LiPO_2F_2$) is synthesized using a reactant including a compound represented by the following Chemical Formula 1; and Step 2 in which the lithium difluorophosphate crystal is purified and subsequently recrystallized.

[Chemical Formula 1]

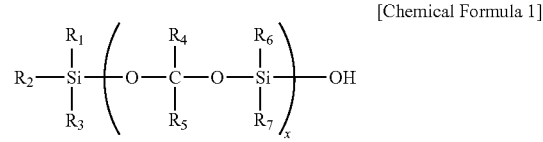

In Chemical Formula 1, $R_1$ to $R_3$ each independently include a $C_{1-10}$ linear alkyl group, a $C_{3-10}$ branched alkyl group, a $C_{6-10}$ cycloalkyl group, a $C_{1-10}$ alkoxy group, a $C_{1-5}$ linear alkyl group having a halide group, a $C_{3-10}$ branched alkyl group having a halide group, an aryl group, or an aryl group having a halide group, preferably include a $C_{1-5}$ linear alkyl group, a $C_{3-5}$ branched alkyl group, a $C_{1-5}$ alkoxy group, a $C_{1-3}$ linear alkyl group having a halide group, a $C_{3-5}$ branched alkyl group having a halide group, a phenyl group, a benzyl group, or a phenyl group having a halide group, and more preferably include a $C_{1-3}$ linear alkyl group, a $C_{3-5}$ branched alkyl group, or a $C_{1-3}$ alkoxy group.

In Chemical Formula 1, $R_4$ to $R_7$ each independently include a hydrogen atom, a $C_{1-10}$ linear alkyl group, a $C_{3-10}$ branched alkyl group, a $C_{1-10}$ alkoxy group, or an aryl group, preferably include a hydrogen atom, a $C_{1-5}$ linear alkyl group, a $C_{3-8}$ branched alkyl group, a phenyl group, or a benzyl group, and more preferably include a $C_{1-3}$ linear alkyl group, a $C_{3-5}$ branched alkyl group, a phenyl group, or a benzyl group.

In addition, in Chemical Formula 1, X is an integer of 0 to 10, preferably an integer of 0 to 5, and more preferably an integer of 0 to 3.

In the preparation method of the present invention, the Step 1 is a process in which a lithium difluorophosphate crystal is synthesized, and consists of the processes including: Step 1-1 in which a liquid mixture of lithium hexafluorophosphate, the above-described reactant, and a solvent is subjected to a synthesis reaction for 10 to 20 hours under an inert gas at a temperature of 45 to 80° C., and thereby a solution containing a reaction product is obtained; and Step 1-2 in which the solution of the Step 1-1 is cooled and subsequently filtered, and thereby the reaction product contained in the solution is obtained.

In this case, it is recommended that the lithium hexafluorophosphate be mixed with the solvent in an amount such that a liquid mixture contains the lithium hexafluorophosphate at a concentration of 1.5 to 5 mol/L, preferably at a concentration of 2.0 to 4.0 mol/L, and more preferably at a concentration of 2.2 to 3.5 mol/L. When the lithium hexafluorophosphate is contained in the liquid mixture at a concentration of less than 1.5 mol/L, the yield of a synthesized lithium difluorophosphate crystal may be undesirably low, and when the lithium hexafluorophosphate is contained in the liquid mixture at a concentration of greater than 5 mol/L, a larger amount of impurities may be produced from the decomposition of lithium hexafluorophosphate, thus reducing purity.

In the Step 1-1, it is recommended that the reactant be used in an amount such that there are 1.0 to 3.0 moles, preferably 1.0 to 2.8 moles, more preferably 1.5 to 2.5 moles, of the reactant for one mole of the lithium hexafluorophosphate. When there is less than 1.0 mole of the reactant for one mole of the lithium hexafluorophosphate, the yield of a synthesized lithium difluorophosphate crystal may be undesirably low, and when there are more than 3.0 moles of the reactant for one mole of the lithium hexafluorophosphate, a large amount of impurities may be generated, and thus the yield and purity of a synthesized lithium difluorophosphate crystal may be undesirably low. In this case, the types of the reactant of the Step 1-1 have been described above.

In the Step 1-1, the solvent being used may include one, or a mixture of two or more selected among a di($C_{1-10}$ alkyl) carbonate, propylene carbonate, and butylene carbonate, and preferably includes one, or a mixture of two or more selected among a di($C_{1-5}$ alkyl) carbonate, propylene carbonate, and butylene carbonate.

In the Step 1-1, it is recommended that the synthesis reaction be carried out at a temperature of 45 to 80° C. for 10 to 20 hours, preferably at a temperature of 45 to 75° C. for 10 to 18 hours, and more preferably at a temperature of 48 to 65° C. for 12 to 18 hours. When the synthesis reaction is carried out at a temperature of less than 45° C., the yield of a lithium difluorophosphate crystal may be lowered, and when the synthesis reaction is carried out at a temperature of greater than 80° C., an additional reaction may undesirably take place, producing an excessive amount of impurities, and therefore the yield and purity of a lithium difluorophosphate crystal may be reduced rather than increased.

The subsequent Step 1-2 is a process in which the solution of Step 1-1 containing a reaction product is cooled and subsequently filtered and thereby the reaction product contained in the solution is obtained, and in this case, it is recommended that the solution be cooled to a temperature of about 20 to 30° C., preferably to a temperature of 20 to 27° C., and subsequently filtered. When the solution is cooled, the reaction product forms a crystalline material. The crystalline material can be obtained by a generally-used filtration method in the art.

The yield of the lithium difluorophosphate crystal ($LiPO_2F_2$) obtained through the Steps 1-1 and 1-2 may be 85% or more and preferably ranges from 85 to 99.5%, and more preferably ranges from 88 to 99.5%.

In the present invention, the lithium difluorophosphate crystal prepared in the Step 1 is purified and subsequently recrystallized in the Step 2, which is performed in addition to the Step 1 in order to further improve the yield and purity, especially purity, of the lithium difluorophosphate crystal being prepared.

The Step 2 may consist of the processes including: Step 2-1 in which a lithium difluorophosphate crystal and an aqueous alcohol solution are introduced into a reactor and subjected to stirring, and thereby purification is performed; Step 2-2 in which the purified product is subjected to primary vacuum concentration; Step 2-3 in which the primary vacuum concentrate is subjected to secondary vacuum concentration; and Step 2-4 in which the secondary vacuum concentrate is dried and subsequently cooled to induce recrystallization, and thereby a lithium difluorophosphate crystal is obtained.

The reactor of the Step 2 may be equipped with a jacket, a vacuum pump, a condenser, a scrubber, and/or a receiver.

The aqueous alcohol solution of the Step 2-1 may be an aqueous solution of a $C_{2-4}$ alcohol, and is preferably an aqueous solution of a $C_{2-4}$ alcohol and more preferably an aqueous ethanol solution having an ethanol concentration of 99.5% to 99.8%. The aqueous alcohol solution may be used in an amount of 500 to 700 parts by weight, preferably 540 to 660 parts by weight, and more preferably 560 to 640 parts by weight with respect to 100 parts by weight of the lithium difluorophosphate crystal. It is recommended that the above-described range be satisfied because when the aqueous alcohol solution is used in an amount of less than 500 parts by weight with respect to 100 parts by weight of the lithium difluorophosphate crystal, the effect of purification may be reduced due to a reduction in solubility, and when the aqueous alcohol solution is used in an amount of more than 700 parts by weight with respect to 100 parts by weight of the lithium difluorophosphate crystal, economic feasibility may be decreased due to an increase in production costs.

Meanwhile, it is recommended that the purification process of the Step 2-1 be performed in a nitrogen atmosphere at a temperature of 23 to 30° C., and it is preferable that the purification process be performed in a nitrogen atmosphere at a temperature of 23 to 27° C.

The subsequent Step 2-2 is a process in which the purified product obtained in Step 2-1 is subjected to primary vacuum concentration. In this case, the primary vacuum concentration may be performed while maintaining a pressure of 25 to 30 Torr in the reactor whose internal temperature has been previously raised to a temperature of 40 to 45° C., and may be continued until all the alcohol vapor distilled from the reactor has been condensed in the condenser and thus no more liquid is collected in the receiver. When the primary vacuum concentration is performed at a temperature of less than 40° C., solvent distillation may not take place and thus productivity may be reduced, and when the primary vacuum concentration is performed at a temperature of greater than 45° C., crystallization may occur, making the concentrate unable to be transferred to a secondary drier. In addition, when the primary vacuum concentration is performed at a pressure of less than 25 Torr, the solvent may overflow into the pump and damage the pump, and when the primary vacuum concentration is performed at a pressure of greater than 30 Torr, process time may be increased, and the product may be decomposed.

The subsequent Step 2-3 is a process in which the primary vacuum concentrate is subjected to secondary vacuum concentration, and it is recommended that Step 2-3 be performed at a temperature of 40 to 45° C. and a pressure of 2 Torr or less and preferably at a temperature of 40 to 45° C. and a pressure of 1 Torr or less. In Step 2-3, when a suitable amount of the vacuum concentrate is obtained, the secondary vacuum concentration process is terminated by terminating the vacuum state with nitrogen. In this case, when the secondary vacuum concentration is performed at a pressure of greater than 2 Torr, the product may be decomposed due to a large amount of residual solvent.

The subsequent Step 2-4 is a process in which the secondary vacuum concentrate is dried, wherein the drying process is performed by a generally-used drying method in the art. According to a preferred embodiment of the present invention, it is recommended that the drying process be rotary drying be performed for about 10 to 14 hours in a vacuum atmosphere of 2 Torr or less at a temperature of 70 to 90° C. and preferably in a vacuum atmosphere of 1 Torr or less at a temperature of 80 to 90° C., using a rotary evaporator.

Once the drying process is completed, the dried product may be cooled to a temperature of 25° C. or less to induce recrystallization, and thereby a lithium difluorophosphate crystal is finally obtained.

The yield of the lithium difluorophosphate crystal of the present invention, which is obtained through recrystallization by carrying out the Steps 1 and 2 of the method of the present invention, may be 80% or more and preferably ranges from 80 to 95.5%, and more preferably ranges from 84.5 to 95%.

In addition, the lithium difluorophosphate crystal obtained through recrystallization according to the method of the present invention may have a degree of relative increase in yield of 3.0 to 15.0% and preferably 3.2 to 14.0% as calculated by the following Equation 1.

Degree of relative increase in yield (%)={(A−B)/B}× 100%   [Equation 1]

In Equation 1, A represents the yield (%) of a LiPO$_2$F$_2$ crystal obtained using a reactant including a compound represented by Chemical Formula 1 and recrystallized, and B represents the yield (%) of a LiPO$_2$F$_2$ crystal obtained using Si(CH$_3$)$_3$OCH$_3$ as a reactant and recrystallized. Here, each of the reactants of A and B refers to the reactant used in the synthesis of a lithium difluorophosphate crystal in Step 1.

In addition, the lithium difluorophosphate crystal obtained through recrystallization according to the method of the present invention may have a degree of relative increase in purity of 1 to 7% and preferably 2.00 to 4.85% as calculated by the following Equation 2.

Degree of relative increase in purity (%)={(A−B)/B}×100%   [Equation 2]

In Equation 2, A represents the purity (%) of a LiPO$_2$F$_2$ crystal obtained using a reactant including a compound represented by Chemical Formula 1 and recrystallized, and B represents the purity (%) of a LiPO$_2$F$_2$ crystal obtained using Si(CH$_3$)$_3$OCH$_3$ as a reactant and recrystallized. Here, each of the reactants of A and B refers to the reactant used in the synthesis of a lithium difluorophosphate crystal in Step 1.

In addition, the lithium difluorophosphate crystal obtained through recrystallization may satisfy a degree of increase in purity of the following Formula 1.

3.5%≤(B−A)/A×100%≤10%, preferably 5.0%≤(B−A)/A×100%≤8.5%, and more preferably 5.0%≤(B−A)/A×100%≤7.5%   [Formula 1]

In Formula 1, A represents the purity (%) of a lithium difluorophosphate crystal synthesized in Step 1, and B represents the purity (%) of a lithium difluorophosphate crystal obtained through recrystallization in Step 2.

The lithium difluorophosphate crystal of the present invention prepared by the above-described method can be used for various purposes, for example, as a component for a stabilizer for a chloroethylene polymer, a reaction catalyst for a lubricating oil, a toothbrush sterilizer, a wood preservative, and the like, and is preferably useful as an electrolyte for a non-aqueous electrolyte solution for a secondary battery.

Hereinafter, the present invention will be described in more detail with reference to exemplary embodiments. However, the following exemplary embodiments are provided to aid understanding of the present invention, and the scope of the present invention should not be construed as being limited by the embodiments.

EXAMPLES

Example 1: Preparation of Lithium Difluorophosphate Crystal Through Recrystallization (1) Preparation of Lithium Difluorophosphate Crystal (Step 1)

Lithium hexafluorophosphate (LiPF$_6$) was introduced into a reactor in a stream of a dry inert gas (nitrogen gas) and added, at a concentration of 2.5 mol/L, to 400 ml of dimethyl carbonate. Subsequently, a compound represented by the following Chemical Formula 1-1 was introduced as a reactant in an amount such that there were 2.0 moles of the compound for 1 mole of the LiPF$_6$, and thereby a liquid mixture was prepared. The liquid mixture formed a suspension by stirring, and the suspension was subjected to a synthesis reaction at a temperature of 50° C. for 16 hours.

After the synthesis reaction was completed, the reaction solution was cooled to a temperature of 26 to 27° C. and then filtered, and thereby a lithium difluorophosphate crystal was obtained. The yield of the obtained lithium difluorophosphate crystal was 90%, and the purity thereof was 93.5%.

[Chemical Formula 1-1]

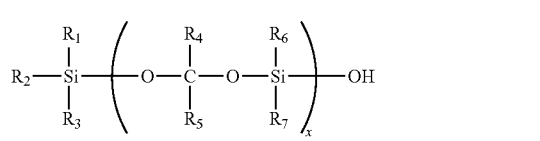

In Chemical Formula 1-1, all of R$_1$ to R$_7$ are a methyl group, and x is 0.

(2) Preparation of Lithium Difluorophosphate Crystal Through Recrystallization (Step 2)

100 parts by weight of the above-described lithium difluorophosphate crystal and 604 parts by weight of a 99.5 to 99.8% aqueous alcohol solution (aqueous ethanol solution) were introduced into the inside of a reactor (LS-SR-301 manufactured by Chunbo Fine Chem Co., Ltd.) equipped with a jacket, a vacuum pump, a condenser, a scrubber, a receiver, and/or the like, and were stirred. The reactor was maintained at a temperature of 24 to 25° C., and the lithium fluoride obtained as a by-product was removed by filtration.

Next, primary vacuum concentration was performed while maintaining the inside of the reactor at a temperature of 43 to 44° C. and an initial pressure of about 28 Torr respectively by introducing hot water into the jacket and operating the vacuum pump. The primary vacuum concentration was continued until all the alcohol vapor distilled from the reactor had been condensed in the condenser and thus no more liquid was collected in the receiver.

Next, the vacuum concentrate obtained through the primary vacuum concentration was subjected to secondary vacuum concentration, which was performed by reducing the pressure to 1 Torr while maintaining the internal temperature within the range of 43 to 44° C. The secondary vacuum concentration was continued until all the remaining aqueous alcohol solution had been condensed in the condenser and thus no more liquid was collected in the receiver.

Next, using a rotary evaporator, the resultant was completely dried over 12 hours at 85° C. while performing distillation using a pump having a degree of vacuum of 1 Torr. The dried product was cooled to a temperature of 25° C. to induce recrystallization, and thereby a lithium difluorophosphate crystal in the form of white powder was finally obtained (yield: 91.7%, purity: 98.2%).

Example 2

Example 2 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 1-2 as a reactant instead of the above-described compound represented by Chemical Formula 1-1.

[Chemical Formula 1-2]

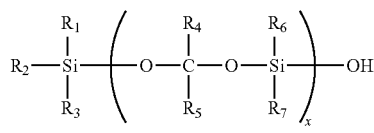

In Chemical Formula 1-2, all of $R_1$ to $R_7$ are a methyl group, and x is 2.

Example 3

Example 3 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 1-3 as a reactant instead of the above-described compound represented by Chemical Formula 1-1.

[Chemical Formula 1-3]

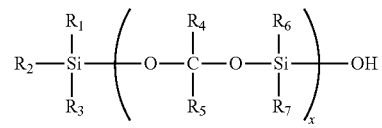

In Chemical Formula 1-3, all of $R_1$ to $R_7$ are a methyl group, and x is 4.

Example 4

Example 4 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 1-4 as a reactant instead of the above-described compound represented by Chemical Formula 1-1.

[Chemical Formula 1-4]

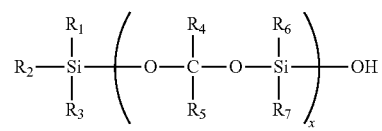

In Chemical Formula 1-4, all of $R_1$ to $R_7$ are a propyl group, and x is 4.

Comparative Example 1

Comparative Example 1 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 2-1 as a reactant instead of the above-described compound represented by Chemical Formula 1-1.

[Chemical Formula 2-1]

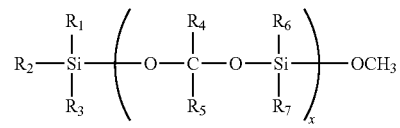

In Chemical Formula 2-1, all of $R_1$ to $R_3$ are a methyl group, and x is 0.

Comparative Example 2

Comparative Example 2 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 2-2 as a reactant instead of the above-described compound represented by Chemical Formula 1-1.

[Chemical Formula 2-2]

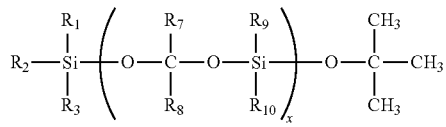

In Chemical Formula 2-2, all of $R_1$ to $R_{10}$ are a methyl group, and x is 0.

Comparative Example 3

Comparative Example 3 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 1-4 as a reactant instead of the above-described compound represented by Chemical Formula 1-1.

[Chemical Formula 1-4]

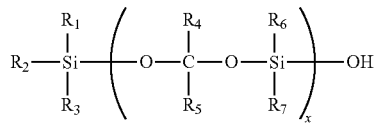

In Chemical Formula 1-4, all of $R_1$ to $R_7$ are a methyl group, and x is 12.

Comparative Example 4

Comparative Example 4 was carried out in the same manner as in Example 1 to prepare a lithium difluorophosphate crystal in the Step 1 and a lithium difluorophosphate crystal through recrystallization, except that the lithium difluorophosphate crystal of the Step 1 was prepared using a compound represented by the following Chemical Formula 2-3 as a reactant instead of the above-described compound represented by Chemical Formula 1-1.

[Chemical Formula 2-3]

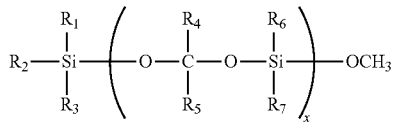

In Chemical Formula 2-3, all of $R_1$ to $R_7$ are a methyl group, and x is 4.

Examples 5 to 10 and Comparative Examples 5 to 11

Examples 5 to 10 and Comparative Examples 5 to 11 were carried out in the same manner as in Example 1 to prepare a lithium difluorophosphate crystal through recrystallization, except that the molar ratio between $LiPF_6$ and the reactant, the $LiPF_6$ concentration in the solvent, and the amount of an aqueous alcohol solution used in the purification process were varied as shown in the following Table 1.

The yield and purity of a $LiPO_2F_2$ crystal synthesized in the Step 1 are shown in the following Table 2. In addition, the yield and purity of a $LiPO_2F_2$ crystal obtained through recrystallization in the Step 2 were expressed respectively in terms of a degree of relative increase in yield and a degree of relative increase in purity with respect to Comparative Example 1, which were calculated using the following Equation 1 and Equation 2.

$$\text{Degree of relative increase in yield (\%)} = \{(A-B)/B\} \times 100\% \quad \text{[Equation 1]}$$

In Equation 1, A represents the yield (%) of a $LiPO_2F_2$ crystal obtained using a reactant including a compound represented by Chemical Formula 1 and recrystallized, and B represents the yield (%) of a $LiPO_2F_2$ crystal obtained using $Si(CH_3)_3OCH_3$ as a reactant and recrystallized.

$$\text{Degree of relative increase in purity (\%)} = \{(A-B)/B\} \times 100\% \quad \text{[Equation 2]}$$

In Equation 2, A represents the purity (%) of a $LiPO_2F_2$ crystal obtained using a reactant including a compound represented by Chemical Formula 1 and recrystallized, and B represents the purity (%) of a $LiPO_2F_2$ crystal obtained using $Si(CH_3)_3OCH_3$ as a reactant and recrystallized.

TABLE 1

| Classification | Type of reactant | $LiPO_2F_2$ crystal synthesized in Step 1 | | $LiPO_2F_2$ crystal prepared in Step 2 (purification process), recrystallized | |
|---|---|---|---|---|---|
| | | $LiPF_6$ concentration in solvent (mol/L) | $LiPF_6$-to-reactant molar ratio | $LiPO_2F_2$ of Step 1 (parts by weight) | Aqueous alcohol solution (parts by weight) |
| Example 1 | Chemical Formula 1-1 | 2.5 | 1:2.2 | 100 | 604 |
| Example 2 | Chemical Formula 1-2 | 2.5 | 1:2.2 | 100 | 604 |
| Example 3 | Chemical Formula 1-3 | 2.5 | 1:2.2 | 100 | 604 |
| Example 4 | Chemical Formula 1-4 | 2.5 | 1:2.2 | 100 | 604 |
| Example 5 | Chemical Formula 1-1 | 2.5 | 1:1.5 | 100 | 604 |
| Example 6 | | 2.5 | 1:2.8 | 100 | 604 |
| Example 7 | | 2.0 | 1:2.2 | 100 | 604 |
| Example 8 | | 3.5 | 1:2.2 | 100 | 604 |

TABLE 1-continued

| Classification | Type of reactant | LiPO$_2$F$_2$ crystal synthesized in Step 1 | | LiPO$_2$F$_2$ crystal prepared in Step 2 (purification process), recrystallized | |
|---|---|---|---|---|---|
| | | LiPF$_6$ concentration in solvent (mol/L) | LiPF$_6$-to-reactant molar ratio | LiPO$_2$F$_2$ of Step 1 (parts by weight) | Aqueous alcohol solution (parts by weight) |
| Example 9 | | 2.5 | 1:2.2 | 100 | 550 |
| Example 10 | | 2.5 | 1:2.2 | 100 | 640 |
| Comparative Example 1 | Chemical Formula 2-1 | 2.5 | 1:2.2 | 100 | 604 |
| Comparative Example 2 | Chemical Formula 2-2 | 2.5 | 1:2.2 | 100 | 604 |
| Comparative Example 3 | Chemical Formula 2-3 | 2.5 | 1:2.2 | 100 | 604 |
| Comparative Example 4 | Chemical Formula 2-4 | 2.5 | 1:2.2 | 100 | 604 |
| Comparative Example 5 | Chemical Formula 1-1 | 2.5 | 1:2.2 | — | |
| Comparative Example 6 | | 2.5 | 1:0.8 | 100 | 604 |
| Comparative Example 7 | | 2.5 | 1:3.5 | 100 | 604 |
| Comparative Example 8 | | 1.2 | 1:2.2 | 100 | 604 |
| Comparative Example 9 | | 5.5 | 1:2.2 | 100 | 604 |
| Comparative Example 10 | | 2.5 | 1:2.2 | 100 | 485 |
| Comparative Example 11 | | 2.5 | 1:2.2 | 100 | 710 |

TABLE 2

| Classification | LiPO$_2$F$_2$ crystal synthesized in Step 1 | | LiPO$_2$F$_2$ crystal prepared in Step 2, recrystallized | | Degree of relative increase in yield (%) | Degree of relative increase in purity (%) |
|---|---|---|---|---|---|---|
| | Yield (%) | Purity (%) | Yield (%) | Purity (%) | | |
| Comparative Example 1 | 84.8 | 90.2 | 82.8 | 96.3 | — | — |
| Example 1 | 93.2 | 93.5 | 91.7 | 98.2 | 10.75 | 3.04 |
| Example 2 | 94.3 | 93.8 | 92.1 | 99.3 | 11.23 | 4.20 |
| Example 3 | 95.5 | 95.2 | 93.8 | 99.9 | 13.29 | 4.83 |
| Example 4 | 93.7 | 93.3 | 90.7 | 98.8 | 9.54 | 3.67 |
| Example 5 | 89.8 | 94.2 | 85.5 | 98.4 | 3.26 | 3.25 |
| Example 6 | 94.7 | 91.0 | 92.6 | 97.3 | 11.84 | 2.10 |
| Example 7 | 90.1 | 93.4 | 87.3 | 97.8 | 5.43 | 2.62 |
| Example 8 | 95.2 | 91.3 | 92.0 | 96.7 | 11.11 | 1.47 |
| Example 9 | 93.2 | 93.5 | 88.9 | 96.5 | 7.38 | 1.26 |
| Example 10 | 93.2 | 93.5 | 91.6 | 98.1 | 10.63 | 2.94 |
| Comparative Example 2 | 85.6 | 91.5 | 83.6 | 97.2 | 0.97 | 1.99 |
| Comparative Example 3 | 82.4 | 87.6 | 78.9 | 91.0 | −4.71 | −4.51 |
| Comparative Example 4 | 80.3 | 88.6 | 76.5 | 92.1 | −7.61 | −3.36 |
| Comparative Example 5 | 93.2 | 93.5 | — | — | — | — |
| Comparative Example 6 | 82.4 | 87.9 | 77.6 | 92.0 | −6.28 | −3.46 |
| Comparative Example 7 | 95.0 | 82.4 | 90.9 | 87.2 | 9.78 | −8.50 |
| Comparative Example 8 | 84.3 | 91.8 | 80.4 | 97.6 | −2.90 | 2.41 |
| Comparative Example 9 | 94.9 | 86.2 | 90.7 | 91.2 | 9.54 | −4.30 |

TABLE 2-continued

| Classification | LiPO$_2$F$_2$ crystal synthesized in Step 1 | | LiPO$_2$F$_2$ crystal prepared in Step 2, recrystallized | | Degree of relative increase in yield (%) | Degree of relative increase in purity (%) |
| --- | --- | --- | --- | --- | --- | --- |
|  | Yield (%) | Purity (%) | Yield (%) | Purity (%) |  |  |
| Comparative Example 10 | 93.2 | 93.5 | 86.8 | 96.4 | 4.83 | 1.15 |
| Comparative Example 11 | 93.2 | 93.5 | 91.5 | 98.2 | 10.51 | 3.04 |

In the case of Examples 1 to 10, the yield of 85% or more and the purity of 90% or more were exhibited as shown in the "Yield (%)" and "Purity (%)" data of the Step 1 in Table 2, and a LiPO$_2$F$_2$ crystal was produced, through recrystallization, at a high yield of 80% or more and with a high purity of 95% or more.

In addition, compared to Comparative Example 1 in which a reactant other than a reactant of the present invention was used, Examples 1 to 10 exhibited a relative increase in yield of 3% or more, with the maximum being 13.29%, and a relative increase in purity of at least 1.26% and as much as 3% or more.

Meanwhile in the case of Comparative Example 2 in which a different type of reactant was used, the yield of a LiPO$_2$F$_2$ crystal obtained through recrystallization was too low, and in the case of Comparative Examples 3 and 4, the yield and purity were low compared to Comparative Example 1.

In the case of Comparative Example 6 in which the LiPF$_6$-to-reactant molar ratio was less than 1:1.0, the yield was significantly low compared to Examples 1 and 5. In the case of Comparative Example 7 in which the LiPF$_6$-to-reactant molar ratio was greater than 1:3.0, the yield was not high and the purity was significantly low compared to Examples 1 and 6, and it is determined that such a result was obtained due to a large amount of impurities produced from the decomposition of raw materials.

In the case of Comparative Example 8 in which the liquid mixture used in the synthesis reaction of the Step 1 had a LiPF$_6$ concentration of less than 1.5 mol/L, the purity was satisfactory but the yield was significantly low compared to Examples 1 and 7, and in the case of Comparative Example 9 in which the liquid mixture had a LiPF$_6$ concentration of greater than 5.0 mol/L, the yield was not high and the purity was low rather than high compared to Examples 1 and 8.

Meanwhile in the case of Comparative Example 10 in which an aqueous alcohol solution was used in an amount of less than 550 parts by weight in the purification process of the Step 2, the yield and purity were low compared to Examples 1 and 9, and in the case of Comparative Example 11 in which an aqueous alcohol solution was used in an amount of more than 650 parts by weight in the purification process of the Step 2, the use of a greater amount of the aqueous alcohol solution did not lead to a further increase in purity.

Example 11

Example 11 was carried out in the same manner as in Example 1 to synthesize a LiPO$_2$F$_2$ crystal in the Step 1 and prepare a LiPO$_2$F$_2$ crystal through recrystallization, except that the synthesis of a LiPO$_2$F$_2$ crystal in the Step 1 was carried out at a temperature of 75° C. The yield in the Steps 1 and 2 are shown in the following Table 3, and the purity in the Steps 1 and 2 and the degree of increase in the purity are shown in the following Table 4. Here, the degree of increase in purity was calculated by the following Equation 3.

$$\text{Degree of increase in purity } (\%) = (B-A)/A \times 100\% \quad \text{[Equation 3]}$$

In Equation 3, A represents the purity (%) of a lithium difluorophosphate crystal synthesized in Step 1, and B represents the purity (%) of a lithium difluorophosphate crystal obtained through recrystallization in Step 2.

Example 12

Example 12 was carried out in the same manner as in Example 1 to synthesize a LiPO$_2$F$_2$ crystal in the Step 1 and prepare a LiPO$_2$F$_2$ crystal through recrystallization, except that the synthesis of a LiPO$_2$F$_2$ crystal in the Step 1 was carried out at a temperature of 46° C.

Example 13

Example 13 was carried out in the same manner as in Example 1 to synthesize a LiPO$_2$F$_2$ crystal in the Step 1 and prepare a LiPO$_2$F$_2$ crystal through recrystallization, except that to prepare a LiPO$_2$F$_2$ crystal through recrystallization, primary vacuum concentration was performed at a temperature of 40 to 41° C.

Comparative Example 12

Comparative Example 12 was carried out in the same manner as in Example 1 to synthesize a LiPO$_2$F$_2$ crystal in the Step 1 and prepare a LiPO$_2$F$_2$ crystal through recrystallization, except that the synthesis of a LiPO$_2$F$_2$ crystal in the Step 1 was carried out at a temperature of 85° C.

Comparative Example 13

Comparative Example 13 was carried out in the same manner as in Example 1 to synthesize a LiPO$_2$F$_2$ crystal in the Step 1 and prepare a LiPO$_2$F$_2$ crystal through recrystallization, except that the synthesis of a LiPO$_2$F$_2$ crystal in the Step 1 was carried out at a temperature of 40° C.

Comparative Examples 14 to 19

Comparative Examples 14 to 19 were carried out in the same manner as in Example 1 to prepare a lithium difluorophosphate crystal through recrystallization, except that different process conditions were applied as shown in the following Table 3. In this case, the process conditions being varied were the conditions of the vacuum concentration processes in the Step 2.

TABLE 3

| Classification | LiPO$_2$F$_2$ crystal synthesized in Step 1 | | LiPO$_2$F$_2$ crystal prepared in Step 2, recrystallized | | | |
|---|---|---|---|---|---|---|
| | Reaction temperature | Yield (%) | Pressure for primary vacuum concentration | Temperature for primary vacuum concentration | Pressure for secondary vacuum concentration | Yield (%) |
| Example 11 | 75° C. | 95.1 | 28 Torr | 43 to 44° C. | 1 Torr | 91.9 |
| Example 12 | 46° C. | 88.0 | 28 Torr | 43 to 44° C. | 1 Torr | 84.9 |
| Example 13 | 50° C. | 93.2 | 28 Torr | 40 to 41° C. | 1 Torr | 86.5 |
| Comparative Example 12 | 85° C. | 95.5 | 28 Torr | 43 to 44° C. | 1 Torr | 92.2 |
| Comparative Example 13 | 40° C. | 85.4 | 28 Torr | 43 to 44° C. | 1 Torr | 80.6 |
| Comparative Example 14 | 50° C. | 93.2 | 28 Torr | 35 to 36° C. | 1 Torr | 88.5 |
| Comparative Example 15 | | | 28 Torr | 48 to 49° C. | 1 Torr | 93.3 |
| Comparative Example 16 | | | 35 Torr | 43 to 44° C. | 1 Torr | 91.0 |
| Comparative Example 17 | | | 1 Torr | 43 to 44° C. | 1 Torr | 92.2 |
| Comparative Example 18 | | | 21 Torr | 43 to 44° C. | 1 Torr | 85.1 |
| Comparative Example 19 | | | 28 Torr | 43 to 44° C. | 4 Torr | 91.8 |

TABLE 4

| Classification | Purity (%), Step 1 | Purity (%), Step 2 | Degree of increase in purity (%) |
|---|---|---|---|
| Example 1 | 93.5 | 98.2 | 5.03 |
| Example 11 | 92.9 | 98.2 | 5.71 |
| Example 12 | 93.4 | 98.9 | 5.89 |
| Example 13 | 93.5 | 99.6 | 6.52 |
| Comparative Example 12 | 88.2 | 93.7 | 6.24 |
| Comparative Example 13 | 93.0 | 98.6 | 6.02 |
| Comparative Example 14 | 93.5 | 98.5 | 5.35 |
| Comparative Example 15 | | 98.0 | 4.81 |
| Comparative Example 16 | | 97.8 | 4.60 |
| Comparative Example 17 | | 95.3 | 1.93 |
| Comparative Example 18 | | 96.5 | 3.21 |
| Comparative Example 19 | | 95.9 | 2.57 |

As shown by the yield and purity data of the Step 1 and the relative purity data of the Step 2 in Table 3 and Table 4, a 4% or more increase in yield was exhibited.

On the other hand, in the case of Comparative Example 12 in which the synthesis of the Step 1 was carried out at 85° C. (i.e., at a temperature of greater than 80° C.), the purity of a LiPO$_2$F$_2$ crystal obtained thereby was significantly low compared to Example 11, and in the case of Comparative Example 13 in which the synthesis was carried out at 40° C. (i.e., at a temperature of less than 45° C.), the yield of a LiPO$_2$F$_2$ crystal obtained thereby was significantly low compared to Example 13.

In the case of Comparative Example 14 in which the primary vacuum concentration was performed at a temperature of less than 40° C., there was a large difference between the yield in the Step 1 and the yield in the Step 2 compared to Example 13, with the yield in the Step 2 being significantly lower than the yield in the Step 1, and in the case of Comparative Example 15 in which the primary vacuum concentration was performed at a temperature of greater than 45° C., there was no difference between the yield in the Step 1 and the yield in the Step 2, but the purity was low rather than high compared to Example 1.

In the case of Comparative Example 16 in which the primary vacuum concentration of the Step 2 was performed at a pressure of greater than 30 Torr, there was a reduction in yield, from 93.2% in Step 1 to 91% in Step 2, and in the case of Comparative Example 18 in which the primary vacuum concentration was performed at a pressure of less than 25 Torr, the reduction in yield was large rather than small compared to Example 1.

In the case of Comparative Example 17 in which the vacuum concentration was performed substantially as a single step rather than multiple steps since the primary and secondary vacuum concentration processes were performed under the same pressure (1 Torr) and temperature (43 to 44° C.) conditions, compared to Example 1, the solvent was rapidly volatilized, causing crystals to be aggregated, and since the drying of the crystals was hindered accordingly, there was a large amount of the residual solvent, which resulted in a relatively low purity.

Meanwhile in the case of Comparative Example 19 in which the secondary vacuum concentration was performed at a pressure of greater than 2 Torr, the same level of yield as in Example 1 was obtained, but the purity was decreased compared to Example 1.

In addition, in the case of Comparative Examples 14 to 18 in which the purification process of the Step 2 was performed under different conditions from those of the present invention, the degree of increase in the purity of the Step 2 with respect to the purity of the Step 1 was very low.

Preparation Examples 1 to 18: Preparation of Non-Aqueous Electrolyte Solution for Secondary Battery A non-aqueous electrolyte solution for a secondary battery was prepared using a high-purity lithium difluorophosphate crystal of one of Examples 1 to 13 as an electrolyte.

Through the above-described Examples, it has been confirmed that the method of the present invention can be used to produce a high-purity lithium difluorophosphate crystal at a high yield. The lithium difluorophosphate crystal of the present invention prepared by the method can be used as a component for a stabilizer for a chloroethylene polymer, a reaction catalyst for a lubricating oil, a toothbrush sterilizer, a wood preservative, and the like, and is preferably used as an electrolyte for a non-aqueous electrolyte solution for a secondary battery so that a non-aqueous electrolyte solution for a secondary battery having excellent stability can be provided.

The method of preparing a lithium difluorophosphate crystal according to the present invention can be used to prepare a high-purity lithium difluorophosphate crystal at a high yield by employing a specific reactant at an optimum composition ratio, and the prepared lithium difluorophosphate crystal can be used as an electrolyte for a non-aqueous electrolyte solution for a secondary battery to provide a non-aqueous electrolyte solution for a secondary battery having excellent stability.

What is claimed is:

1. A method of preparing a high-purity lithium difluorophosphate crystal, the method comprising:
   Step 1 in which a lithium difluorophosphate crystal ($LiPO_2F_2$) is synthesized using a reactant including a compound represented by the following Chemical Formula 1; and
   Step 2 in which a recrystallized lithium difluorophosphate crystal is obtained by purifying the lithium difluorophosphate crystal of the Step 1 and subsequently inducing recrystallization,
   wherein the Step 1 includes:
   Step 1-1 in which a solution containing a reaction product is obtained by subjecting a liquid mixture of lithium hexafluorophosphate, the reactant, and a solvent to a synthesis reaction for 10 to 20 hours under an inert gas at a temperature of 45 to 80° C.; and
   Step 1-2 in which the reaction product contained in the solution of the Step 1-1 is obtained by cooling and subsequently filtering the solution:

[Chemical Formula 1]

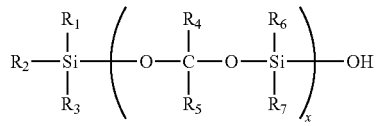

wherein in Chemical Formula 1,
$R_1$ to $R_3$ each independently include a $C_{1-10}$ linear alkyl group, a $C_{3-10}$ branched alkyl group, a $C_{6-10}$ cycloalkyl group, a $C_{1-10}$ alkoxy group, a $C_{1-5}$ linear alkyl group having a halide group, a $C_{3-10}$ branched alkyl group having a halide group, a phenyl group, a benzyl group, or a phenyl group having a halide group,
$R_4$ to $R_7$ each independently include a hydrogen atom, a $C_{1-10}$ linear alkyl group, a $C_{3-10}$ branched alkyl group, a $C_{1-10}$ alkoxy group, a phenyl group, or a benzyl group, and
X is an integer of 0 to 10.

2. The method of claim 1, wherein in the liquid mixture of the Step 1-1, the lithium hexafluorophosphate and the reactant are included in a molar ratio of 1:1.0 to 3.0.

3. The method of claim 1, wherein the solvent of the Step 1-1 includes one or more selected among a di($C_{1-10}$ alkyl) carbonate, propylene carbonate, and butylene carbonate.

4. The method of claim 1, wherein the Step 2 includes:
   Step 2-1 in which purification is performed by introducing a lithium difluorophosphate crystal and an aqueous solution of a $C_{2-4}$ alcohol into a reactor and stirring;
   Step 2-2 in which the product of the purification is subjected to primary vacuum concentration;
   Step 2-3 in which the product of the primary vacuum concentration is subjected to secondary vacuum concentration; and
   Step 2-4 in which a recrystallized lithium difluorophosphate crystal is obtained by subjecting the product of the secondary vacuum concentration to a drying process and then cooling.

5. The method of claim 4, wherein in the Step 2-1, the aqueous alcohol solution is used in an amount of 550 to 650 parts by weight with respect to 100 parts by weight of the lithium difluorophosphate crystal.

6. The method of claim 1, wherein the recrystallized lithium difluorophosphate crystal of the Step 2 has a degree of relative increase in yield of 3.0 to 15% as calculated by the following Equation 1, Degree of relative increase in yield (%)={(A−B)/B}×100%    [Equation 1]

wherein in Equation 1, A represents the yield (%) of a recrystallized lithium difluorophosphate crystal obtained using a reactant including a compound represented by Chemical Formula 1, and B represents the yield (%) of a recrystallized lithium difluorophosphate crystal obtained using $Si(CH_3)_3OCH_3$ as a reactant.

7. The method of claim 1, wherein a yield of the recrystallized lithium difluorophosphate crystal of the Step 2 has a degree of relative increase in purity of 1 to 7% as calculated by the following Equation 2, Degree of relative increase in purity (%)={(A−B)/B}×100%    [Equation 2]

wherein in Equation 2, A represents the purity (%) of a recrystallized lithium difluorophosphate crystal obtained using a reactant including a compound represented by Chemical Formula 1, and B represents the purity (%) of a recrystallized lithium difluorophosphate crystal obtained using $Si(CH_3)_3OCH_3$ as a reactant.

* * * * *